Figures 1, 2:
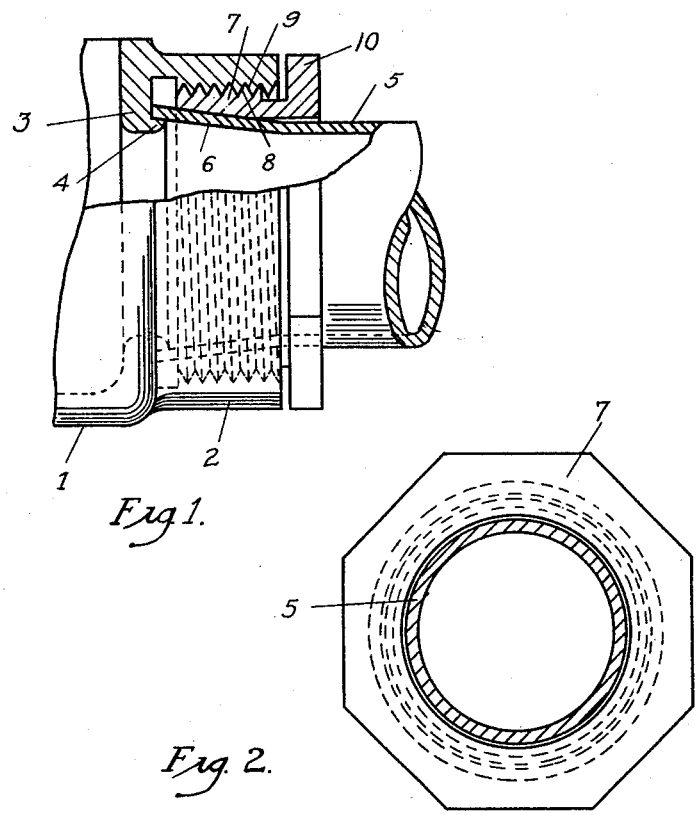

Nov. 1, 1932.          E. J. S. SWANSON          1,885,490
                        CONDUIT FITTING
                      Filed April 4, 1928

Elmer J. S. Swanson
INVENTOR.

BY
ATTORNEYS.

UNITED STATES PATENT OFFICE

ELMER J. S. SWANSON, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed April 4, 1928. Serial No. 267,413.

The present invention is designed to improve conduit fittings for threadless conduits by strengthening the connection between the fitting and the conduit. Features and details of the invention will appear from the specification and claim.

A preferred embodiment of the invention is illustrated in the accompanying drawing as follows:—

Fig. 1 shows a side elevation of a part of a conduit fitting, partly in section.

Fig. 2 an end view.

1 marks a conduit box. This has the internally screw-threaded conduit-receiving extension 2 and inner guard shoulder 3. The inner guard shoulder is provided with a rib 4 on its outer face surrounding the inner edge of the shoulder.

A conduit 5 is provided with a flaring end 6 which extends over the rib 4.

A locking follower 7, preferably having the same flare, or taper as the conduit, engages the flaring surface of the conduit. This is provided with screw threads 8 on its outer periphery which engage screw threads 9 of the extension. The locking follower is extended to without the socket and provided with a wrench-hold 10 at its outer end.

The follower will engage and clamp the flared end of the tube up against the guard shoulder. Greater clamping strain may be put upon the flared end providing the flared end is supported against collapse by the rib 4. This affords a union between the conduit and the fitting that is capable of standing great pulling strain and is also, if the threads are properly made, water-tight.

What I claim as new is:—

In combination with a conduit having a flared end flaring both the inner and outer surfaces of said end, of a conduit fitting having a body with a conduit-receiving opening terminating in a guard shoulder at its inner end, said guard shoulder having an outwardly extending rib having the corner between its inner periphery and outer end rounded, the outer periphery of the rib engaging the inner surface of the flared end; a follower in the opening in the body engaging the flared end of the conduit, the end of the follower being in axially spaced relation from the end of the rib whereby the flared end may be contracted into engagement with the outer periphery of the rib and through its elasticity by reason of the spaced relation conform to the surface of the rib; and means forcing the follower toward the guard shoulder.

In testimony whereof I have hereunto set my hand.

ELMER J. S. SWANSON.